Aug. 29, 1961     K. SITTEL     2,998,048
METHOD AND APPARATUS FOR PRODUCING FIBROUS STRUCTURES
Filed Dec. 21, 1954     2 Sheets-Sheet 1

INVENTOR:
Karl Sittel,
BY Paul & Paul
ATTORNEYS.

Aug. 29, 1961 K. SITTEL 2,998,048
METHOD AND APPARATUS FOR PRODUCING FIBROUS STRUCTURES
Filed Dec. 21, 1954 2 Sheets-Sheet 2
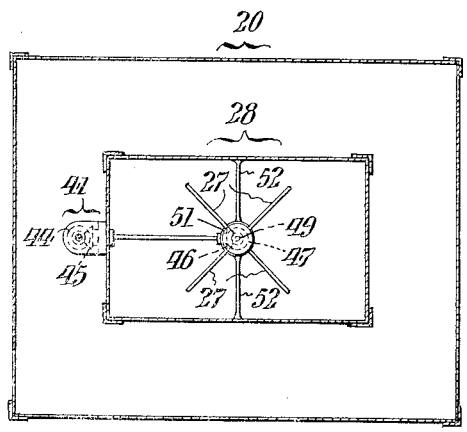
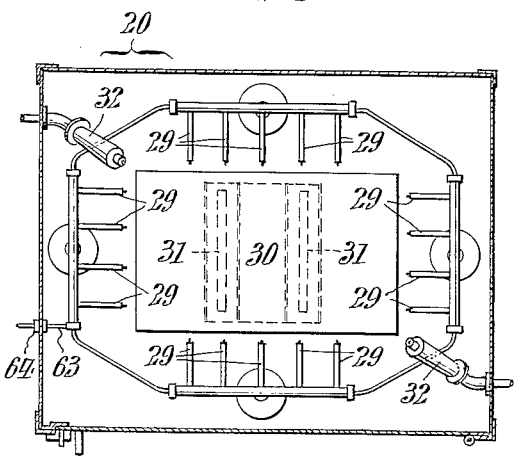
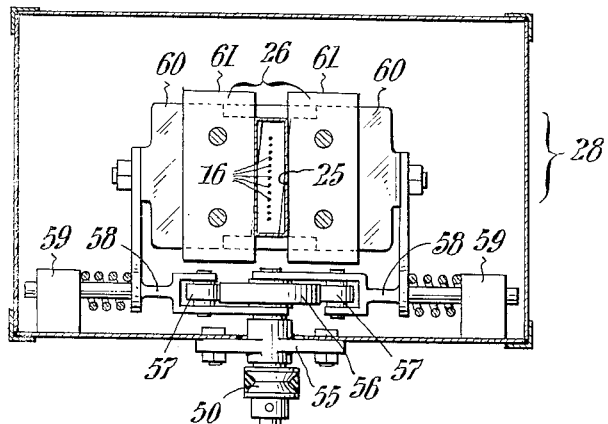
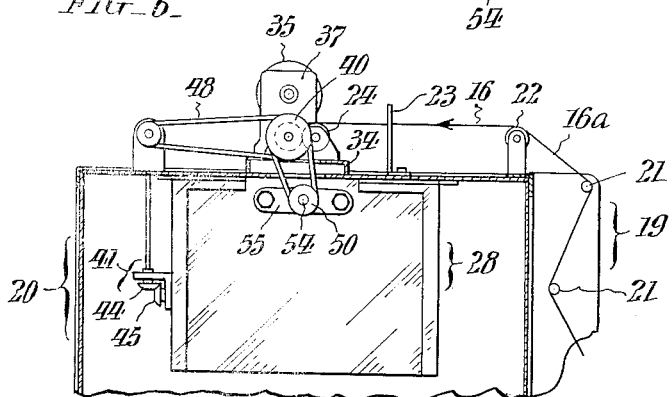
INVENTOR:
Karl Sittel,
BY Paul & Paul
ATTORNEYS.

United States Patent Office 2,998,048
Patented Aug. 29, 1961

2,998,048
METHOD AND APPARATUS FOR PRODUCING FIBROUS STRUCTURES
Karl Sittel, Philadelphia, Pa., assignor, by mesne assignments, to Walsco Company, a partnership
Filed Dec. 21, 1954, Ser. No. 476,733
10 Claims. (Cl. 154—1)

This invention relates to a method and apparatus for producing fibrous structures, and more specifically to a method and apparatus which utilizes electrostatic forces.

Fibrous products of different size and shape are presently manufactured. Of particular interest are products made of resin reinforced with glass fibers or rods such as Fiberglas. These products are satisfactory for some purposes and have a wide field of application. However, the processes by which they are produced include steps that are laborious, time consuming and uneconomical. Further, a number of obstacles must be eliminated before major prigress can be made in the mass production of such fibrous articles. Accordingly, this invention relates to the uniform deposition of fibers on a support to form a coherent mat, such deposition being accomplished by the utilization of electrostatic forces. These fibers may be of any vegetable, animal, mineral or synthetic fibrous material. The fibrous mat may be bound together by any suitable binding material of a sticky, adhesive, glutinous, tacky character, such as resin.

Two well known methods of manufacturing a fibrous article are the Tailoring Method and the Preform Method.

In the known method of producing regularly shaped plastic fibrous articles it is generally required that the Fiberglas or other fibrous material be shaped to fit the mold which will ultimately be used.

In the Tailoring Method the process starts with sheets of Fiberglas material which are cut into sections and placed over and about one half of the negative mold which has been coated with a suitable parting material. Resin is applied to the fiber mats, the mold is closed, a center pressure body is inflated with air forcing the fiber mats against the mold and the mold is heated to the curing temperature. In this operation the edges of the several fiber mats are joined by the bonding resin to form a complete article. The Tailoring Method has a number of disadvantages. Tailoring the fiber mats to conform to the irregular surfaces of the negative mold consumes time and storage of the mats requires considerable space.

In the Preform Method the fibers are drawn to and deposited on a shaped preform screen by a vacuum. After the fibers have been dispersed over the screen forming a mat a preliminary layer of resin is applied to the fibers to form a structure strong enough to withstand removal from the preform screen. This structure is then removed from the preform screen and placed in a final mold where the final resin is applied and the molding operation performed. The Preform Method has a number of disadvantages. The size of the product is somewhat limited, and the application of a preliminary layer of resin is time consuming. The thickness of the fiber mat is limited by the suction of the vacuum which suction decreases with the increasing thickness of the deposited fiber mat. Further, it is difficult to obtain a uniform thickness of fiber mat because of the varying amount of airflow over the uneven surface of an irregularly shaped structure.

It will be noted that the Tailoring and Preform Methods simply constitute alternate methods of preparing the Fiberglas or other fibrous mat material for the ultimate molding operation. In either case the molding may be achieved by matched die molding in which rigid mated die parts are forced together or by the inflated bag molding method in which the pressure against the fibrous material is developed by inflating a flexible central pressure body. In both cases the object is to compress the fibrous material eliminating the entrapped air and producing an intimate fiber resin contact.

It is accordingly an object of this invention to provide a safe, economical, and efficient method of producing fibrous structures.

It is a further object of this invention to provide a method of producing fibrous structure of improved, uniform quality.

Another object of this invention is to provide a method of producing a fibrous structure in which the ingredients thereof are mixed more thoroughly and efficiently.

Still another object of this invention is to provide a method of producing an irregularly shaped structure of uniform thickness.

Other objects and advantages of the invention will be understood from the detailed description to follow, throughout which reference is made to the accompanying drawings which represent apparatus that merely illustrate the process of the invention, said apparatus being susceptible to numerous changes.

FIG. 3 represents a view taken along line III—III of FIG. 1, looking in the direction of the arrows.

FIG. 4 represents a view taken along line IV—IV of FIG. 1, looking in the direction of the arrows.

FIG. 5 represents a view taken along line V—V of FIG. 1, looking in the direction of the arrows; and FIG. 6 represents a fragmentary view in elevation of the upper part of the apparatus of FIG. 1.

Figure 1:
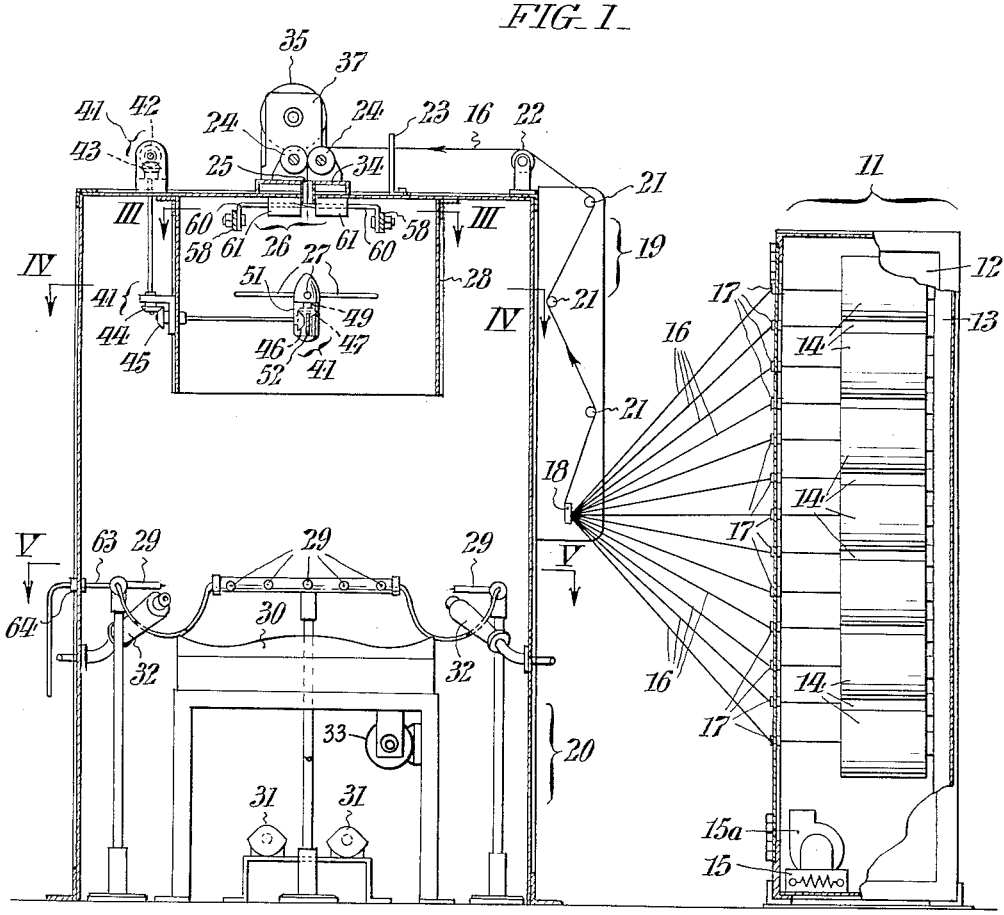
FIG. 1 represents a view in front elevation, partly cut away, of the apparatus suitable for the practice of the process of the invention.

In accordance with this invention a spool of fibrous thread material is preheated to remove moisture therefrom. This fibrous material is unrolled and then cut into elongated strips. The elongated strips are distributed uniformly in space above a collecting electrode which is at substantially ground potential. The force of gravity transports the strips into an electrostatic field where a negative charge is imparted to each of said strips. The negatively charged strips are attracted by and deposited upon the grounded collecting electrode and are uniformly dispersed thereon to form a mat with a negative surface charge. The strips bend around the corners of the collecting electrode and produce a coherent mat in which the strips are evenly distributed. The negative surface charge of the mat builds up to such a value that the strips dispersed in space are no longer strongly attracted to the grounded collecting electrode. At this point the supply of strips is stopped. Then finely dispersed resin particles are passed through an oppositely charged electrostatic field where a positive charge is imparted to each of said resin particles. These positively charged resin particles are attracted by and deposited upon the fiber mat, effectively impregnating the mat to bind it together. The positively charged resin particles initially deposited on the negatively charged fiber mat operate to discharge the negative charge of the mat. Subsequently deposited resin particles form a layer of resin with a positive surface charge. This positive surface charge builds up to such a value that the resin particles dispersed in space are no longer attracted to the grounded electrode. At this point the supply of resin is cut off and the supply of negatively charged fiber strips is turned on. The negatively charged fiber strips are strongly attracted by and deposited upon the positively charged layer of resin particles and are uniformly dispersed thereon to form a mat with a negative surface charge. The steps of forming a mat of negatively charged fiber strips and then a layer of positively charged resin particles are repeated as often as necessary to build a structure of the required thickness. The process is carried on in a substantially moisture free atmosphere.

Turning now to the drawings, the numeral 11 designates a creel having a housing 12 enclosing a supporting rack 13 on which are mounted a multiplicity of bobbins 14 of Fiberglas yarn impregnated with a binding material to keep the yarn rolled tightly. A thermostatically controlled heater element 15 with a blower 15a is also mounted within housing 12 and serves to circulate warm air, temperature of about 70° C., through the interior of housing 12 and around the bobbins 14 to eliminate any film of moisture from the yarn. The yarns 16 are fed from creel 11 through eyelets 17 uniformly spaced in one side of housing 12 to a spacer bar 18 fixed to stretching board 19 mounted on a housing 20. From the spacer bar 18, the yarns are passed upwardly around stretching board posts 21 and horizontally over guide roller 22, through a spacer comb 23 to a pair of delivery rollers 24 on the top of housing 20. Delivery rollers 24 direct the yarns downwardly through a guide channel 25 to a cutter 26 which is adjusted to cut the yarns into strips of any desired length. These Fiberglas strips, which are preferably about 2 inches long, fall freely through the force of gravity toward spinning rods 27 which are positioned within housing 20 directly below cutter 26. The spinning rods 27 distribute the falling Fiberglas strips uniformly over a horizontal area defined by a confining enclosure 28. Such uniformly distributed strips fall through an electrostatic field set up by a multiplicity of point electrodes 29 and are directed to a grounded collecting electrode 30 for deposit thereon to form a mat. Two 1000 watt radiating heaters 31 are positioned beneath collecting electrode 30 and keep the interior of housing 20 substantially moisture free at a temperature above ambient.

Spray guns 32 are provided at opposite sides of collecting electrode 30 and are positioned to project streams of binding particles to a zone intermediate the spinning rods 27 and collecting electrode 30. The spray of dispersed binding particles fall by gravity from said zone through the electrostatic field set up by the point electrodes 29, said field having a charge opposite that created for the strips. These charged binding particles are thus given a charge opposite that of the mat formed by the Fiberglas strips or particles and are attracted by said mat to impregnate the strips and form a layer thereon of binding particles of polarity opposite that of said mat. The resin is sprayed after the Fiberglas particles have been deposited on collecting drum electrode 30. When the deposition of Fiberglas strips has progressed to the point where the charge buildup on the deposited mat has reduced the efficiency of deposition, the polarity at the electrodes 29 is reversed. The flow of Fiberglas particles ceases and the spray of resin into the electrostatic field begins.

Figure 2:
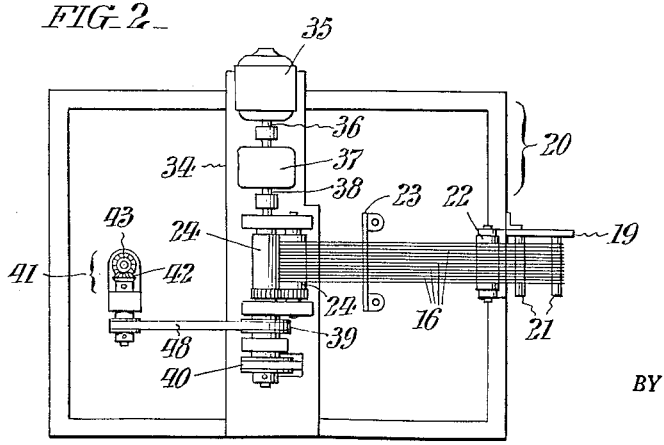
FIG. 2 represents a view in plan of the apparatus of FIG. 1.

FIG. 2 is a view of the top of housing 20 and shows in detail the positioning of the elements mounted thereon. A base plate 34 supports a motor 35 from which extends a rotatable shaft 36 which enters a reduction gear box 37. A rotatable shaft 38 runs from gear box 37 and drives the delivery rollers 24 as well as a spinning rod belt pulley 39 and a cutter belt pulley 40. Spinning rod belt pulley 39 causes the rotation of spinning rods 27. A gear train 41, including miter gears 42—47, a belt 48, and a rotating spindle 49 is provided to transmit the energy from pulley 39 to rods 27 (see FIGS. 2 and 1). Cutter belt pulley 40 drives pulley 50 (FIG. 3) of cutter 26.

FIG. 3 is a view taken as indicated by the line III—III and associated arrows, illustrating the component parts of cutter 26. Pulley 50 includes a shaft 54 mounted in bearing 55 on confining enclosure 28. The distal end of shaft 54 supports a cam 56. Spring backed rollers 57 ride upon the surface of the circumference of cam 56, the roller shaft means 58 being laterally slidable in bearing blocks 59 of enclosure 28. A pair of cutting blades 60 are attached to the roller shaft means 58 and slide within bearing blocks 61 affixed to the underside of the top member of housing 20. The action of blades 60 cuts the yarn 16 into strips of the desired length.

FIG. 6 is a fragmentary view in elevation of the upper part of the apparatus of FIG. 1 and illustrates in greater detail the elements of which FIG. 2 is a view in plan.

FIG. 4 is a view taken as indicated by the line and arrows IV—IV of FIG. 1, and shows how the spinning rods 27 are positioned within confining enclosure 28 and how spindle housing 51 is supported by a pair of braces 52 attached to enclosure 28.

FIG. 5 is a view taken along the line V—V of FIG. 1, looking in the direction of the arrows and illustrates in plan view the arrangement of point electrodes 29 and a power supply conductor 63 which enters housing 20 through an electrical fitting 64.

In accordance with this invention, fibrous material in the form of a yarn 16 is unraveled from the bobbins 14 and delivered to the cutter 26 after passing through eyelets 17, spacer bar 18, stretching board posts 21, guide roller 22, spacer comb 23, delivery rollers 24, and guide channel 25. Cutter 26 acts upon the fibrous yarn 16 to form elongated fiber strips.

The elongated fiber strips are distributed uniformly in the space defined by confining enclosure 28 by the action of spinning rods 27. The spatial distribution of the fiber strips is important in the achieving of homogeneous coverage of the collecting electrode 30. The necessary distribution depends on the individual problem and varies with the area and shape of the surface of electrode 30. Higher speeds of rotation of spinning rods 27 throw more of the fiber strips toward the inner surface of confining enclosure 28 but tend to decrease the volume density in the center. Proper spatial distribution of the fiber strips is obtained by adjusting the speed of rotation of spinning rods 27 and the distance of said rods from cutter 26.

The force of gravity transports the fiber strips into an electrostatic field, a corona discharge created by the pin points 29 which are negatively charged to a high electric potential from a rectifier unit (not shown) through conductor 63. In this electrostatic field, a negative charge is imparted to each of the fiber strips. The charged strips are attracted by and deposited upon grounded electrode 30 and by the repellent action of their equal polarity charge are uniformly dispersed thereon to form a mat with a negative surface charge. The strips bend around the corners of the collecting electrode and produce a coherent mat in which the strips are evenly distributed. A more satisfactory distribution of the fibrous particles across the surface 30 may be achieved by agitating the electrode such as by attaching a mechanical or other type vibrator 33 to it. In this manner the falling particles will be given a greater opportunity to disperse themselves in accordance with the electrostatic field.

It has been determined that the relative humidity within housing 20 strongly influences the electrical behavior of the fiber strips. At high humidity, the strips have a thin water film on their surface and surface conductivity is such that upon absorbing the negative charge from the electrostatic field, the fiber strips become polarized and, like a conductor, orient themselves in the field and attach themselves to one another. The strips are strongly attracted to collecting electrode 30, but they do not lie down and a mat is not formed. When the electrostatic field is shut off, the strips on the vertical sides of electrode 30 immediately drop off.

When the humidity is low, a completely different result occurs. Now the acquired charge is fixed on the strips and they lie flat on the collecting electrode 30 as close as possible to said electrode. The strips do not orient themselves in the field, but instead tend to lie flat and, since they have the same charge, to locate themselves perpendicular to each other in a criss-cross fashion. The deposition around corners is good, the strips bending at corners to achieve a continuous coverage.

Humidity adversely affects the process but is easily controlled. It has been found that heating the bobbins of fibrous material to approximately 70° C. and inducing a hot upward draft of air from the heaters 31 beneath the collecting electrode 30 eliminates the deleterious action of humidity and promotes deposition. Such heating reduces the conductivity of the fibrous strips to such a degree that on turning off the electrostatic field, the fibrous strips will not drop off the collecting electrode 30 but will remain strongly attached thereto.

It is to be understood that the apparatus herein shown and described merely illustrates the process of the invention. Various changes may be made in the shape, size and arrangement of parts. Equivalent elements may be substituted for those described herein, parts and polarities may be reversed and certain features of the invention may be utilized independently of the use of other features, all without departing from the spirit of the invention or the scope of the subjoined caims. The fiber strips may be introduced into the electrostatic field by any suitable means such as by blowers, and any suitable spraying means may be used to introduce the resin particles into the electrostatic field. For purposes of illustration in the description it was assumed that negative charges were applied to the fiber strips and positive charges were applied to the resin particles. These charges may be reversed, the only requirement being that the fiber strips be electrically charged in an opposite sense from the resin particles.

Having thus described my invention, I claim:

1. The process of manufacturing a fibrous article comprising the steps of first placing an electrostatic charge upon fibrous particles, then electrostatically dispersing said fibrous particles with said electrostatic charge fixed thereon upon a collecting electrode to form a charged fibrous layer, then placing an electrostatic charge upon resin particles, and finally electrostatically dispersing said resin particles with said electrostatic charge fixed thereon upon said charged fibrous layer.

2. A method of producing a resin-glass fiber structure comprising cutting glass fibers into elongated strips, distributing said strips uniformly in space above a collecting electrode of irregular surface, transferring said strips to an electrostatic field, and charging said strips by the electrostatic field to deposit said strips on said collecting electrode.

3. A process of producing a fibrous structure comprising the steps of preheating a roll of fibrous material to remove moisture therefrom, then cutting said fibrous roll into elongated strips, then distributing said strips uniformly in space, then transferring said uniformly distributed strips to an electrostatic field, imparting like electrical charges to said strips while in said electrostatic field, then depositing said charged strips on a collecting electrode, said charged strips forming a layer with a surface charge of like signs as said strips, then dispersing resin particles of opposite charge upon said strip layer to neutralize the surface charge of said strip layer and form a layer of resin with a surface charge of opposite polarity than that of said strip layer, then disposing elongated strips of fibrous material of the first said polarity upon said resin layer to neutralize the surface charge of said resin layer and form a fibrous layer with a surface charge of opposite polarity from that of said resin layer.

4. The process defined in claim 3 wherein the steps are performed in a heated, substantially moisture free atmosphere.

5. A process of manufacturing a fibrous article comprising establishing a first electrostatic field, introducing fibrous particles into said field whereby the fibrous particles are electrically charged, depositing said fibrous particles bearing said electrical charge upon a mold to form a mat, then reversing the polarity of said electrostatic field, introducing particles of binding material into said field whereby the binding particles are electrically charged in opposite sense from the fibrous particles, and depositing said binding partcles bearing said electrical charge upon said mat of fibrous particles.

6. Apparatus for forming a fibrous structure comprising a collecting electrode, means for electrostatically depositing charged particles upon said electrode to form a layer, and means for electrostatically depositing oppositely charged binding particles upon said first mentioned particle layer.

7. Apparatus for forming a fibrous structure comprising a collecting electrode, means for placing an electrostatic charge upon fibrous particles whereby to disperse said fibrous particles upon said electrode to form a fibrous layer, and means for placing an electrostatic charge of opposite polarity upon binding particles whereby to disperse said binding particles upon said fibrous layer.

8. A process of manufacturing a fibrous plastic article comprising alternately depositing charged fibrous and binding particles upon a base electrostatically, at the same time vibrating said base and then removing the surface charge developed by the electrostatic forces.

9. The apparatus of claim 7 further characterized by vibrating means adapted to vibrate said collecting electrode.

10. The process of manufacturing a fibrous article comprising first electrostatically depositing charged fiber particels upon a support to form a fibrous layer until an electrostatic charge is built up on said fibrous layer which substantially retards further deposition of said fiber particles, electrostatically depositing binder particles charged opposite to said fiber particles upon said fibrous layer to form a binder layer until an electrostatic charge is built up on said binder layer which substantially retards further deposition of said binder particles.

References Cited in the file of this patent

UNITED STATES PATENTS

| | | |
|---|---|---|
| 2,451,934 | Evans | Oct. 19, 1948 |
| 2,466,906 | Miller | Apr. 12, 1949 |
| 2,491,889 | Bennett et al. | Dec. 20, 1949 |
| 2,493,194 | Heino | Jan. 3, 1950 |
| 2,527,501 | Saks | Oct. 24, 1950 |
| 2,561,449 | Ruderman | July 24, 1951 |
| 2,592,602 | Saks | Apr. 15, 1952 |
| 2,686,141 | Sawyer | Aug. 10, 1954 |
| 2,790,741 | Sonneborn et al. | Apr. 27, 1957 |